United States Patent
Prakash et al.

(10) Patent No.: US 11,100,605 B2
(45) Date of Patent: *Aug. 24, 2021

(54) VIRTUAL MACHINE GRAPHICS RESOURCE USAGE

(71) Applicant: VMware, Inc., Palo Alto, CA (US)

(72) Inventors: Lakshmana Prakash, Bengaluru (IN); Sendhil Kumar, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,383

(22) Filed: Oct. 7, 2019

(65) Prior Publication Data

US 2020/0058094 A1 Feb. 20, 2020

Related U.S. Application Data

(63) Continuation of application No. 16/415,864, filed on May 17, 2019, now Pat. No. 10,438,316, which is a
(Continued)

(30) Foreign Application Priority Data

Nov. 7, 2016 (IN) .............................. 201641038044

(51) Int. Cl.
*G06T 1/20* (2006.01)
*G06F 9/50* (2006.01)
*G06F 9/455* (2018.01)

(52) U.S. Cl.
CPC ............ *G06T 1/20* (2013.01); *G06F 9/45533* (2013.01); *G06F 9/50* (2013.01)

(58) Field of Classification Search
CPC ... G06T 1/20; G06T 2200/28; G06F 9/45558; G06F 2009/4557; G06F 9/5077;
(Continued)

(56) References Cited

U.S. PATENT DOCUMENTS

| 10,438,316 | B2* | 10/2019 | Prakash | G06F 9/5044 |
| 2009/0275407 | A1* | 11/2009 | Singh | G07F 17/32 463/31 |

(Continued)

OTHER PUBLICATIONS

Dedicated GPU Technology for Virtual Desktops. Dedicated Virtual GPU Pass-Through Technology from Grid. NVIDIA. Retrieved Aug. 22, 2016. Retrieved from the Internet: URL: <http://www.nvidia.com/object/dedicated-gpus.html>, 4 pages.
(Continued)

*Primary Examiner* — Maurice L. McDowell, Jr.
*Assistant Examiner* — Donna J. Ricks
(74) *Attorney, Agent, or Firm* — Fish & Richardson P.C.

(57) ABSTRACT

Methods, systems, and apparatus, including computer programs encoded on computer storage media, for calculating graphics resources for a virtual machine. One of the methods includes determining resources available on a graphics card device included in a computer executing a plurality of virtual machines, each virtual machine configured to execute a virtual desktop; determining, based on data received from a hypervisor that manages execution of at least one of the plurality of virtual machines, a graphics profile for a virtual machine included in the plurality of virtual machines executing on the computer; determining a portion of the available resources on the graphics card device allocated to the virtual machine using the graphics profile; and computing an amount of resources on the graphics card device consumed by a virtual desktop of the virtual machine based on the portion of the available resources on the graphics card device allocated to the virtual machine.

25 Claims, 4 Drawing Sheets

Related U.S. Application Data continuation of application No. 15/409,545, filed on Jan. 19, 2017, now Pat. No. 10,304,153.

(58) Field of Classification Search
CPC ........ G06F 9/45533; G06F 9/505; G06F 9/50; G06F 2209/503; H04L 47/821
See application file for complete search history.

(56) References Cited

U.S. PATENT DOCUMENTS

| | | | |
|---|---|---|---|
| 2011/0083131 A1 | 4/2011 | Pirzada et al. | |
| 2013/0291062 A1* | 10/2013 | Bursell | H04L 63/08 726/4 |
| 2014/0176583 A1 | 6/2014 | Abiezzi et al. | |
| 2014/0181807 A1 | 6/2014 | Fonseca et al. | |
| 2014/0215462 A1 | 7/2014 | Kuo et al. | |
| 2015/0067672 A1 | 3/2015 | Mitra et al. | |
| 2015/0356773 A1* | 12/2015 | Kumar | G06F 9/45558 345/520 |
| 2015/0363218 A1 | 12/2015 | Heyrman et al. | |
| 2015/0371355 A1* | 12/2015 | Chen | G06T 1/20 345/505 |
| 2017/0075713 A1* | 3/2017 | Le Bars | G06F 9/45558 |
| 2018/0095799 A1* | 4/2018 | Criou | G06F 9/5044 |
| 2018/0130171 A1 | 5/2018 | Prakash et al. | |
| 2018/0239648 A1* | 8/2018 | Formanek | G06F 9/5077 |
| 2019/0196858 A1* | 6/2019 | Chakraborty | G06F 9/452 |

OTHER PUBLICATIONS

Deliver virtual or hosted desktops and applications through a single platform with VMware Horizon 7. VDI Virtual Desktop Infrastructure with Horizon. VMware. Retrieved Aug. 22, 2016. Retrieved from the Internet: URL<http://www.vmware.com/products/horizon.html>, 11 pages.

NVIDIA Grid Data Sheet. NVIDIA. Published Mar. 2016. Retrieved from the Internet: URL <http://images.nvidia.com/content/pdf/grid/data-sheet/61773_GRID-3-0_Print_Soft-Launch_Datasheet_Letter_LR.pdf >, 2 pages.

True Virtual Acceleration With GPUs. Virtual GPU Technology for Hardware Acceleration. NVIDIA Grid. NVIDIA. Retrieved Jul. 27, 2016. Retrieved from the Internet: URL<http://www.nvidia.com/object/grid-technology.html>, 3 pages.

* cited by examiner

VIRTUAL MACHINE GRAPHICS RESOURCE USAGE

CROSS REFERENCE TO RELATED APPLICATION

This application is a continuation application of U.S. patent application Ser. No. 16/415,864, filed on May 17, 2019, which is a continuation application of U.S. patent application Ser. No. 15/409,545, filed on Jan. 19, 2017, and claims the benefit of Foreign Application Serial No. 201641038044, filed in India on Nov. 7, 2016, both of which are incorporated herein in its entirety.

BACKGROUND

This specification relates to virtual machines.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system (OS), referred to herein as a guest OS, and applications. A physical computer system, referred to herein as a host machine, can execute one or more virtual machines. A host system may include one or more host machines, e.g., servers.

A virtual machine can be accessed remotely through a network connection. For example, it is possible to use a remote client to access a virtual machine remotely. A remote client is a program that communicates user interface information with a remote system. Generally, the user interface information includes display data, which is received from the remote system and displayed locally to the user on a client device, and the remote client sends inputs generated by the user to the remote system. In this way, applications executing remotely from the client device can be accessed and interacted with by the user.

SUMMARY

In general, one innovative aspect of the subject matter described in this specification can be embodied in methods that include the actions of determining resources available on a graphics card device included in a computer executing a plurality of virtual machines, each virtual machine configured to execute a virtual desktop; determining, based on data received from a hypervisor that manages execution of at least one of the plurality of virtual machines, a graphics profile for a virtual machine included in the plurality of virtual machines executing on the computer; determining a portion of the available resources on the graphics card device allocated to the virtual machine using the graphics profile; and computing an amount of resources on the graphics card device consumed by a virtual desktop of the virtual machine based on the portion of the available resources on the graphics card device allocated to the virtual machine. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include determining, using the portion of the available resources on the graphics card device allocated to the virtual machine and the amount of resources on the graphics card device consumed by the virtual desktop of the virtual machine, whether to change the graphics profile for the virtual machine to a second graphics profile that indicates a different portion of resources on a second graphics card device that should be allocated to the virtual machine; and sending, to the hypervisor, second data for the second graphics profile to cause an execution of the virtual machine using the different portion of resources on the second graphics card device. The graphics card device may be the same model as the second graphics card device. Computing the amount of resources on the graphics card device consumed by the virtual desktop of the virtual machine may include computing the amount of resources on the graphics card device consumed by the virtual desktop of the virtual machine using the graphics profile during a first execution of the virtual machine. Sending, to the hypervisor, the second data for the second graphics profile to cause an execution of the virtual machine using the different portion of resources on the second graphics card device may include causing a second execution of the virtual machine on a second computer that includes the second graphics card device using resources allocated to the virtual machine based on the second graphics profile, the second execution of the virtual machine being a different execution than and occurring after the first execution of the virtual machine. The second graphics profile may be specific to a first type of graphics card device or a first graphics card device architecture. Causing the second execution of the virtual machine on the second computer that includes the second graphics card device using resources allocated to the virtual machine based on the second graphics profile may include determining, using the second graphics profile, that a particular computer that includes the first type of graphics card device or a particular graphics card device with the first graphics card device architecture is not available for the second execution of the virtual machine; determining that another graphics profile for a second type of graphics card device, different than the first type of graphics card device, or for a second graphics card device architecture, different than the first graphics card device architecture, identifies at least the resources identified by the second graphics profile in response to determining that a particular computer that includes the first type of graphics card device or a particular graphics card device with the first graphics card device architecture is not available for the second execution of the virtual machine; determining that the second graphics card device is specific to the other graphics profile; determining that the second computer includes the second graphics card device; and selecting the second computer for the second execution of the virtual machine in response to determining that the second computer includes the second graphics card device.

In some implementations, the method may include causing presentation of data identifying the portion of the available resources on the graphics card device allocated to the virtual machine and the amount of resources on the graphics card device consumed by the virtual desktop of the virtual machine. Determining the portion of the available resources on the graphics card device allocated to the virtual machine using the graphics profile may include determining a maximum quantity of virtual machines that can be assigned to the graphics card device using the graphics profile; and determining the portion of the available resources on the graphics card device allocated to the virtual machine using the maximum quantity of virtual machines that can be assigned to the graphics card device. The method may include determining a profile identifier for the graphics profile; and creating a mapping between the profile identifier and an identifier for the virtual machine upon execution of the virtual machine on the computer. Determining the graphics profile for the virtual machine included in the plurality of virtual machines executing on the computer may include determining, using the mapping between the profile identifier and the identifier for the virtual machine, the profile identifier. The method may include receiving the data from the hypervisor that identifies the graphics profile for the virtual machine.

The subject matter described in this specification can be implemented in particular embodiments and may result in one or more of the following advantages. In some implementations, the systems and methods described below may change a graphics profile used to allocate resources for execution of a virtual application based on the resources actually used during the execution to more efficiently allocate resources for execution of multiple different virtual applications. For example, a system may determine that a subset of the graphics resources on a graphics card device are not used for execution of a first virtual application to which the graphics resources were allocated and can be used instead for execution of a second virtual application, e.g., that could not otherwise be executed using the graphics card device, to reduce power consumed by the graphics card device, or both. A system may determine a more efficient allocation of graphics resources for execution of a virtual desktop or another graphics intensive application. In some implementations, a system may cause a particular host to execute virtual machines with the same graphics profile to increase efficient allocation of resources to virtual machines, reduce unused resources on physical graphics devices, reduce a number of hosts in the system that are being used and power required for those hosts, e.g., by disabling hosts that are not executing any virtual machines, or a combination of two or more of these. In some implementations, a system may notify a user device when a virtual machine is not being used and, in response to input from the user device, terminate a session for the virtual machine to allow the resources previously used to execute the virtual machine to be allocated to a different virtual machine or turned off.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When a client device requests a session for a virtual application that has a graphics rich user interface, e.g., a graphics rich virtual desktop, a host system may allocate graphics resources on a graphics device, e.g., a Peripheral Component Interconnect Express (PCIe) graphics device, to a virtual machine executing the virtual application. For example, the host system may determine a set of graphics resources that represent a virtual graphics device for the virtual machine. The virtual machine may use a portion of a physical graphics processing unit (pGPU) included on the graphics device for execution of a virtual graphics processing unit (vGPU) and allocate a portion of a frame buffer memory included on the graphics device for use by the vGPU.

The host system may use a graphics profile to determine properties of the virtual graphics device. For instance, the graphics profile may indicate a particular type of physical graphics device, physical resources from a physical graphics device that should be allocated to a virtual graphics device, or both. The graphics profile may indicate a percentage of physical graphics resources for the virtual graphics device. The graphics profile may indicate quantities of physical graphics resources, such as a number of pGPUs; a number of vGPUs; an amount of frame buffer memory; a number of processing units per second for processing, e.g., a number of polygons per second or instructions per second for the vGPU; a type of physical graphics device; a model for a physical graphics device; a vendor of a physical graphics device; or a combination of two or more of these.

The host system may monitor the virtual graphics device to determine whether to use different graphics properties for the virtual graphics device during a subsequent execution of the virtual machine. For example, the host system may determine whether more or fewer resources should be allocated to the virtual graphics device depending on the actual graphics resources used during execution of the virtual machine.

In some implementations, the virtual application may be any appropriate type of application. The virtual application may be a virtual desktop for a virtual machine. In some examples, the virtual application may be an application that requires dedicated graphics resources for efficient generation of a user interface. For instance, the virtual application may be a graphics design application executing on a virtual machine.

Figure 1:
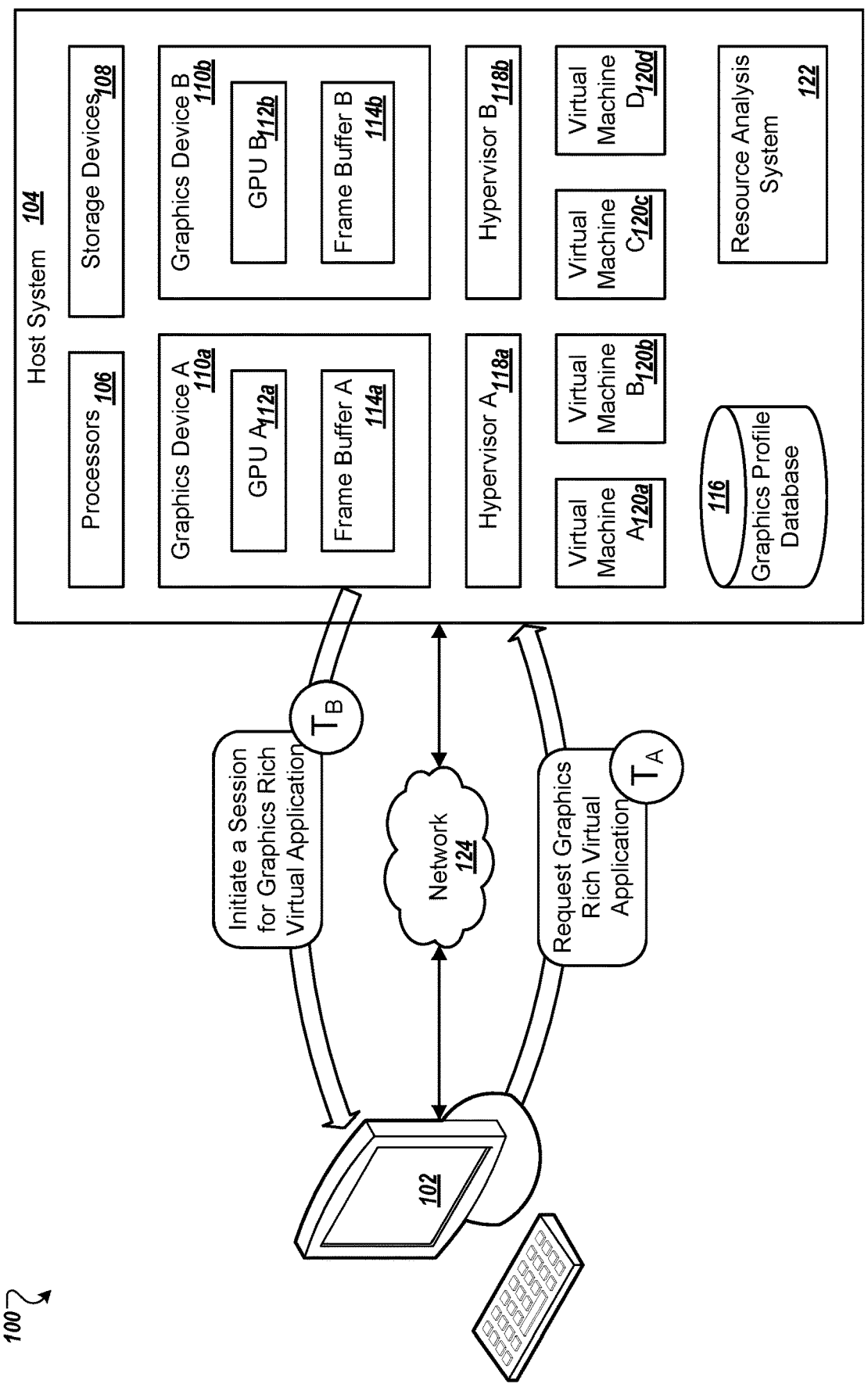
FIG. 1 is an example of an environment in which a host system monitors graphics resources allocated to a virtual machine for a client device.

FIG. 1 is an example of an environment 100 in which a host system 104 monitors graphics resources allocated to a virtual machine A 120*a* for a client device 102. For instance, the host system 104 allocates physical graphics resources to execution of the virtual machine A 120*a* as one or more virtual graphics devices for the virtual machine A 120*a*. The host system 104 may monitor the use of the virtual graphics devices for the virtual machine A 120*a* to determine whether a different allocation of graphics resources may be more efficient for the virtual machine A 120*a*. In some examples, the host system may be a virtual center or may be included in a virtual center. A virtual center may include multiple physical computers each of which may include one or more of the components described with reference to the host system.

For example, the host system 104 is an example of a system implemented as computer programs on one or more computers in one or more locations, in which the systems, components, and techniques described below are implemented. The host system 104 may use a single server computer or multiple server computers operating in conjunction with one another, including, for example, a set of remote computers deployed as a cloud computing service.

The host system 104 receives, at time TA, a request from the client device 102 for a virtual application. The virtual application may be a graphics rich virtual application. The virtual application may be a graphics rich virtual desktop. The client device 102 may include personal computers, mobile communication devices, and other devices that can send and receive data over a network 124. For instance, the host system 104 receives the request from the client device 102 across the network 124. The network 124, such as a local area network (LAN), wide area network (WAN), the Internet, or a combination thereof, connects the client device 102, and the host system 104.

The host system 104 determines to allocate dedicated graphics hardware to the execution of the requested virtual application. For instance, the host system 104 includes multiple processors 106, multiple storage devices 108, and multiple physical graphics devices A-B 110a-b. Each of the physical graphics devices A-B 110a-b includes one or more graphics processors A-B 112a-b, e.g., pGPUs A-B 112a-b, and a frame buffer memory A-B 114a-b. The host system 104 uses the request to identify the requested virtual application and allocate resources for use executing the requested virtual application. The resources may include resources of the graphics devices A-B 110a-b, resources of the processors 106, resources of the storage devices 108, or a combination of two or more of these.

In some implementations, each hypervisor A-B 118a-b manages resources on a single physical graphics device A-B 110a-b. For example, a first hypervisor A 118a manages resources for virtual machines A-B 120a-b allocated resources from a first graphics device A 110a and a second hypervisor B 118b manages resources for virtual machines C-D 120c-d allocated resources from a second graphics device B 110b. In some examples, a hypervisor, e.g., the first hypervisor A 118a, may manage resources for multiple physical graphics devices, e.g., both the graphics devices A-B 110a-b.

The host system 104 may use the request to determine a graphics profile for execution of the virtual application. For instance, the request may include a graphics profile identifier. The graphics profile may be specific to the virtual application, the client device 102, or both. In some examples, the graphics profile identifier may be specified by user input and the request may include data that identifies the graphics profile identifier.

The host system 104 may use the graphics profile identifier to determine the graphics resources for allocation to the virtual application during execution. The host system 104 may access a graphics profile database 116 that includes a mapping of graphics profile identifiers to data indicating graphics resources for allocation of execution of a virtual application. An example of a mapping for four graphics profile identifiers is shown in Table 1, below.

TABLE 1

| Graphics Profile Identifier | Frame Buffer Memory | Maximum vGPU per pGPU | Maximum vGPUs per Graphics Device |
| --- | --- | --- | --- |
| K120Q | 512 MB | 8 | 32 |
| K140Q | 1 GB | 4 | 16 |
| K160Q | 2 GB | 2 | 8 |
| K180Q | 4 GB | 1 | 4 |

The graphics profile database 116 may include a record for each graphics profile identifier, e.g., that uses the graphics profile identifier as a key. The record may identify the mapping for the specific graphics profile identifier, for instance by including the graphics profile identifier and values that represent properties of a vGPU, a frame buffer memory, or both. The record may indicate the specific resources for use during execution of corresponding virtual applications. In some examples, the record may indicate that the host system 104 should use a particular quantity of a particular resource for execution of a virtual application, e.g., 4 MB of physical frame buffer memory. The particular quantity may be a maximum quantity for the execution of the virtual application. As another example, the record may indicate that the host system 104 should use a particular percentage of a particular resource or of all resources, e.g., twenty-five percent of frame buffer memory and twenty-five percent of the pGPUs. For instance, the record may indicate that the graphics device should allocate four vGPUs to each pGPU and use twenty-five percent of the pGPU for execution of a corresponding virtual application. The host system 104 may generate the graphics profiles stored in the graphics profile database 116. The host system may use data that generated based on an administrator input, a graphics device vender specification, or both, to create the graphics profiles.

Each of the graphics profiles may be for a particular vendor or a particular graphics device A-B 110 a-b. The particular graphics device may be developed by a particular vendor, may be a model of graphics device manufactured by one of multiple different manufacturers, or both. For example, a first graphics device A 110 a may have three graphics profiles each of which indicate a different number of pGPUs and a different quantity of frame buffer memory for allocation to an application executed using the graphics profile. In some examples, a second graphics device B 110 b may have five graphics profiles that each indicate percentages of the physical graphics resources, the graphics processors B 112 b and the frame buffer memory B 114 b, that should be allocated to virtual applications. For instance, when a graphics device 110 includes four pGPUs and 16 GB of frame buffer memory, a first graphics profile may indicate allocation of an eighth of a single pGPU and 512 MB of frame buffer memory to execution of a virtual application. A second graphics profile may indicate allocation of one quarter of a single pGPU and 1 GB of frame buffer memory to execution of a virtual application. A third graphics profile may indicate allocation of one pGPU and 4 GB of frame buffer memory to execution of a virtual application.

The host system 104 provides information about the graphics resources to be used for execution of the virtual application to a hypervisor A 118a to cause execution of the virtual application. For instance, the hypervisor A 118a receives the graphics information indicated by the graphics profile for the virtual application. The hypervisor A 118a determines a server that includes available graphics resources specified by the graphics information. The hypervisor A 118a causes the server to launch a virtual machine A 120*a* for the virtual application using the graphics resources specified by the graphics information. For instance, the server allocates graphics resources specified by the graphics information to execution of the virtual machine A 120*a* for the virtual application. The hypervisor A 118*a* monitors execution of the virtual application on the server.

The host system 104 initiates a session, at time TB, for the virtual application with the client device 102. For example, the host system 104 uses remote session communications protocols to provide the client device 102 with data for presentation of a user interface for the virtual application on a display. The virtual application may be a virtual desktop for the virtual machine A 120*a* or an application executing on the virtual machine A 120*a*. The virtual application may be a graphics intensive application, e.g., that requires dedicated graphics resources for execution.

The host system 104, e.g., a resource analysis system 122 running on the host system 104, may monitor the execution of the virtual application, the virtual machine A 120*a*, or both, on the server included in the host system 104. For instance, the resource analysis system 122 may communicate with the hypervisor A 118*a* to determine the physical graphics resources allocated to the virtual machine A 120*a*, the physical graphics resources actually used by the virtual machine A 120*a* during execution of the virtual application, or both.

The host system 104 includes multiple devices, e.g., computers, each of which execute different ones of the virtual machines A-D 120*a-d*, execute one or more hypervisors A-B 118*a-b* that monitor the virtual machines A-D 120*a-d*, or both. For example, the host system 104 may include a first server that executes the hypervisor A 118*a*, a second server that executes the virtual machine A 120*a*, and a third server that executes the resource analysis system 122 to analyze the execution of the virtual machine A 120*a* to determine whether to use a different graphics profile during a subsequent execution of the virtual application.

The resource analysis system 122 may request and receive first data from the first server that identifies the graphics profile for the virtual application. For instance, after the session for the virtual application between the client device 102 and the host system 104 ends, the resource analysis system 122 may request the graphics profile identifier for the virtual application from the first server, e.g., from the hypervisor A 118*a* executing on the first server.

The resource analysis system 122 may request and receive second data from the second server that indicates graphics resources used for execution of the virtual application. In some examples, the resource analysis system 122 may request and receive the second data from the first server, e.g., from the hypervisor A 118*a*. The resource analysis system 122 may send a request, after the session for the virtual application between the client device 102 and the host system 104 ends, to the second server for second data that indicates the graphics resources used during the execution of the virtual application. The second data that indicates the graphics resources used may include an average amount of frame buffer memory 114 used for execution of the virtual application, an average number of instructions per second for execution of the virtual application, detailed graphics resource usage data for a particular period of time that indicates specific amounts of resources used, or a combination of two or more of these. The particular period of time may be for the entire session or a subset of the session between the client device 102 and the host system 104 for the virtual application.

The resource analysis system 122 may compare the first data and the second data to determine whether to change a graphics profile for the virtual application. For instance, the resource analysis system 122 may determine whether execution of the virtual application requires more or less physical graphics resources, e.g., and the virtual application can be executed more efficiently, or whether the graphics profile should remain the same. In response, the resource analysis system 122 may change the profile the virtual application and, based on the new graphics profile, the physical graphics resources allocated during later execution of the virtual application.

Figure 2:
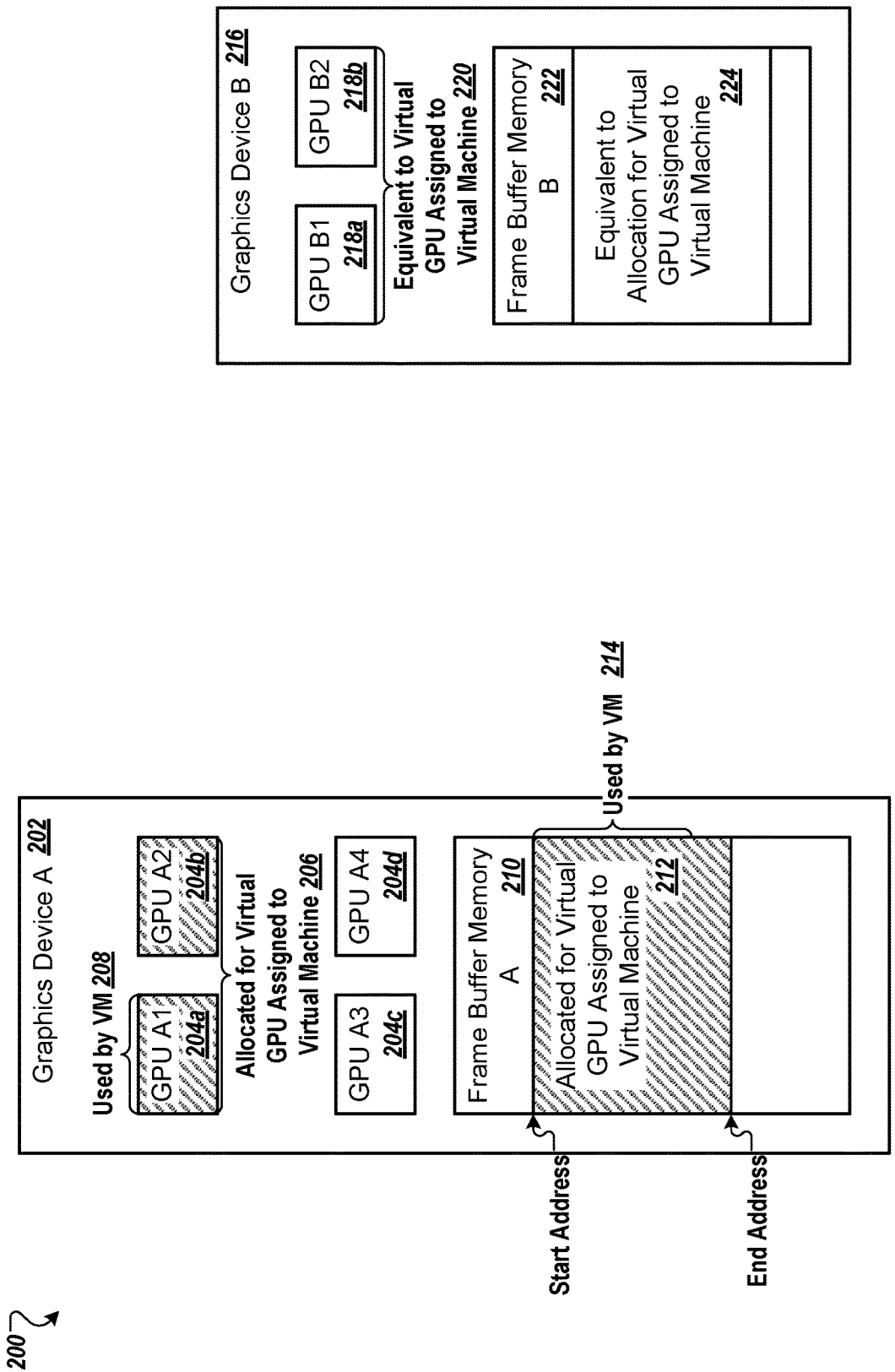
FIG. 2 shows an example of an environment that includes a first graphics device A and a second graphics device B, both for execution of virtual machines.

FIG. 2 shows an example of an environment 200 that includes a first graphics device A 202 and a second graphics device B 216, both for execution of virtual machines. In some examples, the first graphics device A 202 and the second graphics device B 216 are manufactured by different vendors. In some other examples, the first graphics device A 202 and the second graphics device B 216 are manufactured by the same vendor and are different graphics device models that include different physical hardware.

A host system may assign execution of a virtual application to a server that includes the first graphics device A 202. For instance, the host system may provide a hypervisor information about the virtual application including a graphics profile for the virtual application that indicates physical graphics resources for execution of the virtual application. The hypervisor may use the graphics profile to determine that a server, which includes the first graphics device A 202, should execute the virtual application. For example, the hypervisor may determine that the first graphics device A 202 has available the necessary amount of physical graphics resources identified by the graphics profile for execution of the virtual application.

In response, the hypervisor provides the server with configuration data for the server, the first graphics device 202, or both. The server can use the configuration data to allocate resources for execution of the virtual application. The configuration data may include data from the graphics profile for the virtual application.

For instance, the hypervisor may cause the first graphics device A 202 to allocate a first pGPU A1 204*a* and a second pGPU A2 204*b* for use as a vGPU 206 for execution of the virtual application. The first graphics device A 202 may use a third pGPU A3 204*c* and a fourth pGPU A4 204*d* for execution of one or more additional virtual applications, each executing on a corresponding virtual machine.

The hypervisor may cause the first graphics device A 202 to allocate a portion of frame buffer memory A 210, included in the first graphics device A 202, as first allocated frame buffer memory portion 212 for execution of the virtual application. For instance, the first graphics device A 202 may determine a start address and an end address for the first allocated frame buffer memory portion 212 from the frame buffer memory A 210. In some examples, the start address, the end address, or both, for the first allocated frame buffer memory portion 212 are fixed for a current execution of the virtual application. For instance, during a session with a client device for which the virtual application is executed, the first graphics device A 202 may maintain the same start address and the same end address for the first allocated frame buffer memory portion 212.

During the execution of the virtual application using the vGPU 206 and the first allocated frame buffer memory portion 212, the hypervisor or another component of the host system monitors the resources on the first graphics device A 202 that are actually used for execution of the virtual application. For example, the hypervisor determines that the server uses a portion 208 of the vGPU 206, e.g., the first pGPU A1 204a, and a subset 214 of the first allocated frame buffer memory portion 212. The hypervisor may determine the portion 208 of the vGPU 206 and the subset 214 of the first allocated frame buffer memory portion 212 as average resources, global maximum resources, local maximum resources, or a combination of two or more of these, used by the server for execution of the virtual application. For instance, the hypervisor may determine a global maximum as the subset 214 of the first allocated frame buffer memory portion 212 that represents the most graphics frame buffer memory used at any particular time during execution of the virtual application and an average portion 208 of the vGPU 206 used by the server for execution of the virtual application across the entire execution of the virtual application.

A host system, e.g., the resource analysis system 122, may use the portion 208 of the vGPU 206 and the subset 214 of the first allocated frame buffer memory portion 212, used during execution of the virtual application, to determine whether to change a graphics profile for the virtual application. For instance, the resource analysis system may receive, from the hypervisor, a graphics profile identifier for the virtual application and data that indicates the portion 208 of the vGPU 206 and the subset 214 of the first allocated frame buffer memory portion 212 used during execution of the virtual application. The resource analysis system may access a graphics profile database using the graphics profile identifier to determine a particular graphics profile that indicates the resources allocated for execution of the virtual application. The resource analysis system may compare the resources allocated for the execution of the virtual application with the data that indicates the portion 208 of the vGPU 206 and the subset 214 of the first allocated frame buffer memory portion 212 used during execution of the virtual application.

Using the comparison, the resource analysis system may determine whether the virtual application can be executed with a different set of resources than those identified in the particular graphics profile. For instance, the resource analysis system may determine that execution of the virtual application used only a first pGPU A1 204a and not a second pGPU A2 204b both of which were allocated for the vGPU 206. The resource analysis system may determine whether there is another graphics profile for the first graphics device A 202, or another graphics device such as the second graphics device B 216, that identifies resources closer to those actually used for execution of the virtual application, e.g., a graphics profile that identifies allocation of only one pGPU on the first graphics device A 202 for a vGPU and at least the subset 214 of the first allocated frame buffer memory portion 212. The resource analysis system may determine that the other graphics will provide a more efficient use of the host system's resources for execution of the virtual application. When the resource analysis system determines that the particular graphics profile is most efficient, the resources analysis system may send the client device a message that indicates that the particular graphics profile is optimal or may take no action.

When the resource analysis system determines the other graphics profile for execution of the virtual application, the resource analysis system may provide, to the client device or another device, a message that identifies the other graphics profile. The message may indicate that the client device should use the other graphics profile for future execution of the virtual application. The message may indicate that use of the other graphics profile will likely cause the host system, or another host system, to allocate resources for use during execution of the virtual application more efficiently than the resources allocated during the previous execution of the virtual application.

When the resource analysis system provides the message to another device, e.g., an administrator device, the message may include, for a virtual application, an amount of current frame buffer memory allocated to the virtual machine; a frame buffer usage percentage; frequency of use data, e.g., hourly, daily, peak hourly frequency, etc.; a recommended frame buffer memory size; or a combination of two or more of these. The message may include, for a virtual application, an amount of current pGPUs or a property of the pGPUs allocated to the virtual machine; a pGPU usage percentage; frequency of use data, e.g., hourly, daily, peak hourly frequency, etc.; a recommended pGPU property, e.g., speed, number of cores, etc.; or a combination of two or more of these.

In some implementations, the message may indicate a cost savings or an additional cost for a change in a profile. For instance, the message may indicate that switching from a first profile to a second profile would reduce the physical resources allocated for execution of a virtual application and reduce costs by a particular amount.

When the resource analysis system provides the message to another device, e.g., an administrator device, the message may include information for multiple virtual applications, e.g., multiple graphics rich virtual desktops. Each of the multiple virtual applications may be monitored by a single hypervisor. Each of the multiple virtual applications may be executed on behalf of the same entity, e.g., client device, corporation, or user account. The message may cause the client device to present a dashboard of metrics associated with each of the multiple virtual applications. The metrics may include various properties about the physical graphics resources allocated to execution of the respective virtual application.

In some implementations, when the resource analysis system determines the other graphics profile for execution of the virtual application, the resource analysis system may provide the host system with data identifying the other graphics profile. The host system may use the other graphics profile automatically during a subsequent execution of the virtual application for the client device, e.g., after receipt of a second request from the client device to execute the virtual application.

When the resource analysis system provides the message to another device, e.g., an administrator device, the resource analysis system may provide the client device with a message that indicates statistics of the execution of the virtual application. For instance, the resource analysis system may provide the client device with instructions to cause the presentation of a user interface with the statistics of the execution of the virtual application. The statistics may include data that represents properties of the vGPU 206, properties of the first allocated frame buffer memory portion 212, or both. The statistics may include data that represents properties of the portion 208 of the vGPU 206, properties of the subset 214 of the first allocated frame buffer memory portion 212, or both, that were used during execution of the virtual application. For instance, the instructions may cause presentation of a user interface that indicates an amount of memory included in the first allocated frame buffer memory portion 212 and the subset 214 of the first allocated frame buffer memory portion 212 that was actually accessed during execution of the virtual application.

Figure 3:
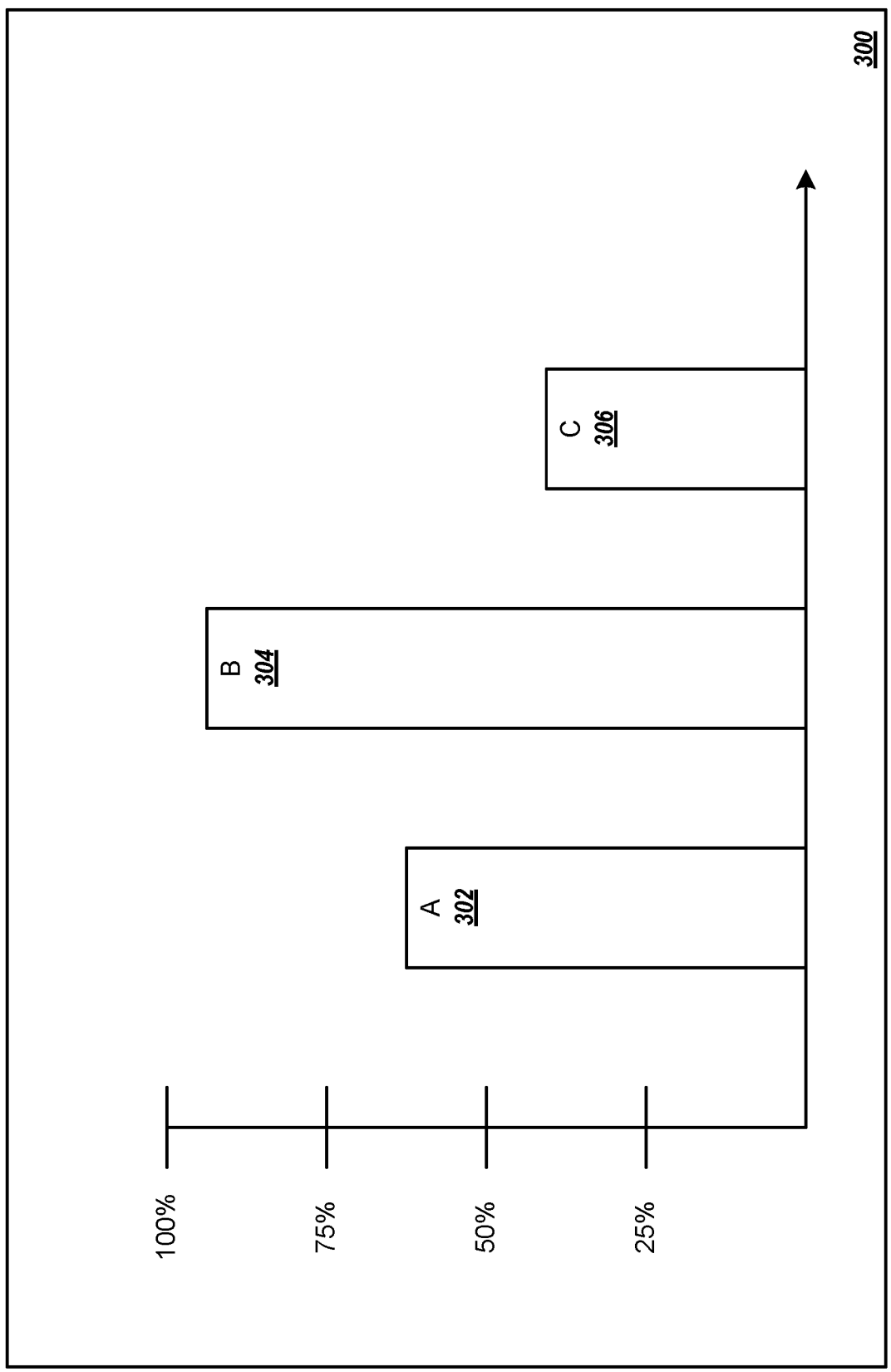
FIG. 3 depicts an example of a user interface that includes statistics of the execution of a virtual machine.

FIG. 3 depicts an example of a user interface 300 that includes statistics of the execution of a virtual machine. The user interface 300 includes three properties A, B, and C 302-306, and respective statistics on the usage of those properties. In some examples, each of the three properties A, B, and C 302-306 may be properties for the execution of a single virtual machine. The first property A 302 may indicate that 62.5% of a portion of frame buffer memory allocated to execution of the virtual machine was used during the execution. The second property B 304 may indicate that, during peak usage, 93.75% of the vGPU cycles allocated for execution of the virtual machine were used during execution. The third property C 306 may indicate that, during non-peak usage, about 40% of the vGPU cycles allocated for execution of the virtual machine were used at a minimum during execution. The percentages may be minimum percentages, maximum percentages, average percentages, or a combination of two or more of these.

In some examples, one or more of the three properties A, B, and C 302-306 may be properties for the execution of different virtual machines. For instance, the first property A 302 may indicate a portion of a frame buffer memory allocated to a first virtual machine, e.g., the virtual machine A 120a, that was used during execution of the first virtual machine. The second property B 304 may indicate a portion of a frame buffer memory allocated to a second virtual machine, e.g., the virtual machine B 120b, that was used during execution of the second virtual machine. The third property C 306 may indicate a portion of a frame buffer memory allocated to a third virtual machine that was used during the execution of the third virtual machine.

All of the virtual machines for which the user interface 300 includes information may be monitored by a single hypervisor. In some examples, some of the virtual machines for which the user interface 300 includes information may be monitored by different hypervisors. For instance, all of the virtual machines may be executed on behalf of a single client while two or more hypervisors may monitor the virtual machines.

The statistics included in the user interface 300 may be for a particular polling interface. For instance, the statistics may be for a polling interval, such as one hour, one day, one month, or another polling interval. The resources analysis system may receive input, e.g., user input, that defines the polling interval. In some examples, the resource analysis system may use a predetermined polling interval.

In some implementations, the resource analysis system may receive data that indicates user input accepting the change from the particular graphics profile to the other graphics profile for execution of the virtual application. For instance, the user interface 300 may include, for a second virtual machine with a resource that is using 100% or close to 100%, e.g., 90%, of a particular resource, e.g., frame buffer memory, a recommendation to change the profile for the respective virtual machine. The recommendation may identify a recommended profile. In some examples, the recommendation may request input identifying another profile, properties for another profile, e.g., as a search feature for another profile, or both.

The resource analysis system may receive the data from the client device, the other device, e.g., the administrator device, or both. The resource analysis system may store data in a database that indicates that the other graphics profile should be used for future execution of the virtual application, e.g., after disconnection of a current session for the virtual application when a new session for the virtual application is initiated.

In some examples, after providing the client device with the message that indicates the other graphics profile, the host system may receive a request for a second execution of the virtual application that identifies the other graphics profile. The host system may cause allocation of resources for the second execution of the virtual application using the other graphics profile.

In some implementations, when the host system determines that resources specific to a graphics profile for a virtual application are not available, the host system identifies other resources that are equivalent to the resources identified in the graphics profile for use during execution of the virtual machine. For example, a hypervisor may receive instructions from the host system to launch a session for the virtual application. The hypervisor determines the graphics profile for the virtual application, e.g., with a graphics profile identifier of K120Q. The hypervisor uses the graphics profile to determine whether graphics resources, identified by the graphics profile, are available for execution of the virtual application. Returning to FIG. 2, the hypervisor may determine that the graphics profile is specific to the first graphics device A 202, e.g., all graphics devices with the same model, vendor, or both, as the first graphics device A 202. The hypervisor determines that sufficient resources for the virtual application, as indicated in the graphics profile, are not available on any graphics devices of the same type as the first graphics device A 202.

In response, the hypervisor uses graphics profile data, e.g., from the graphics profile database, to determine another graphics profile that is equivalent to the graphics profile, e.g., with a graphics profile identifier of K220Q. For instance, the hypervisor may use a mapping, e.g., stored in the graphics profile database, that indicates which graphics profiles are equivalent to other graphics profiles and can be used for execution of a virtual application. Table 2, below, indicates one example of two graphic profiles that are equivalent. Graphics profile K120Q and K220Q are equivalent because the same amount of frame buffer memory is allocated for execution of a corresponding virtual application. The graphics profiles may be equivalent because each pGPU is allocated the same quantity of vGPUs.

TABLE 2

| Graphics Profile Identifier | Frame Buffer Memory | Maximum vGPU per pGPU | Maximum vGPUs per Graphics Device |
|---|---|---|---|
| K120Q | 512 MB | 8 | 32 |
| K220Q | 512 MB | 8 | 16 |

In some implementations, the mapping may indicate that another graphics profile can be used instead of the graphics profile without a negative performance impact on a virtual application that will use resources identified by the other graphics profile compared to the virtual application using the original resources identified by the graphics profile. In some examples, the hypervisor may determine the graphics device properties identified in the graphics profile and another graphics profile that identifies the same graphics device properties. For instance, the graphics profile and the other graphics profile may indicate that 512 MB of frame buffer memory, two virtual display heads, one eighth of a pGPU should be allocated for execution of a corresponding virtual application. Both graphics profiles may indicate a maximum display resolution, per display head, of 2560 by 1600.

The hypervisor may determine that the graphics profile indicates allocation of a first pGPU A1 204a and a second pGPU A2 204*b* for a vGPU 206 and a first allocated frame buffer memory portion 212 should be assigned to the vGPU 206 for execution of a virtual application. The hypervisor may determine that the other graphics profile, that is equivalent to the graphics profile, indicates allocation of a first different pGPU B1 218*a* and a second different pGPU B2 218*b*, on a second graphics device B 216, as a second vGPU 220 along with a second allocated frame buffer memory portion 224 in a second frame buffer memory B 222, included in the second graphics device B 216.

The equivalence of the graphics profile and the other graphics profile may be approximate. For instance, the other graphics profile may indicate slightly more or slightly fewer resources. The other graphics profile may indicate that the second allocated frame buffer memory portion 224 has the same memory size or a different memory size, the same latency or a different latency, or a combination of these, as the first allocated frame buffer memory portion 224. The other graphics profile may indicate that the second vGPU 220 has the same properties or different properties as the vGPU 206. Some example properties may include a number of cores, a number of chip sockets, a number of instructions per second, a clock speed, or a combination of two or more of these.

The hypervisor may use the other graphics profile to determine a particular second graphics device B 216 that has resources available for execution of the virtual application. For instance, the hypervisor may determine that a particular server includes an array of second graphics devices B 216 and that one of the graphics devices in the array is not being used. The hypervisor may determine that the particular server has other resources available for execution of the virtual application, e.g., memory resources, processor resources, or both. The hypervisor assigns execution of the virtual application to the particular server to cause the particular server, and the one of the graphics devices in the array, to allocate resources for execution of the virtual application and launch a virtual machine, using the allocated resources, for the virtual application.

In some implementations, the hypervisor may use a database that indicates which physical graphics resources are in use and which graphics resources are available. The hypervisor may analyze the database, e.g., a table in the database, to que resources for use during execution of a virtual application. For instance, the hypervisor may query the database using data from a graphics profile, e.g., a physical device model or physical device vendor or another profile property, to determine available resources. The available resources may be on a per host level in a cluster, e.g., in the host system. The hypervisor may also determine other physical resources available for execution of a virtual application in addition to the physical graphics resources available for execution of the virtual application.

In some implementations, the hypervisor may use data representing the resources used by a virtual application during a previous execution when determining another graphics profile that is the equivalent of a graphics profile typically used for execution of the virtual application. For instance, the hypervisor may determine whether the portion 208 of the vGPU 206, the subset 214 of the first allocated frame buffer memory portion 212, or both, from a previous execution of the virtual application indicate that execution of virtual application uses most of or less than the resources identified by the graphics profile. The data representing the resources used by the virtual application during a previous execution may be included in a request to create a session for the virtual application, may be stored in a database, e.g., a record specific to the requesting device and the virtual application, or another appropriate location.

When the hypervisor determines that execution of the virtual application uses most of the resources identified by the graphics profile, the hypervisor may select another graphics profile that identifies the same or more resources than the graphics profile. For instance, when the graphics profile indicates that 1 MB of frame buffer memory should be allocated to execution of the virtual machine, the hypervisor may select another graphics profile that indicates that 1 MB or more, e.g., 2 MB, should be allocated to execution of the virtual machine.

When the hypervisor determines that execution of the virtual application uses less than the resources identified by the graphics profile, the hypervisor may select another graphics profile that identifies fewer resources than the graphics profile. For example, when the graphics profile indicates that 1 MB of frame buffer memory should be allocated to execution of the virtual machine, the hypervisor may select another graphics profile that indicates that 0.5 MB should be allocated to execution of the virtual machine.

In some implementations, a hypervisor may use a comparison of the resources allocated for the execution of a virtual application with the data that indicates the portion 208 of the vGPU 206 and the subset 214 of the first allocated frame buffer memory portion 212 used during execution of the virtual application to determine that more resources should be allocated to execution of the virtual application. For instance, the hypervisor may determine that, on average, the vGPU is processing instructions at maximum capacity and that another graphics profile, that identifies higher allocations of resources, should be assigned to the virtual application.

In some implementations, the host system may receive a request for data identifying resources allocated to a virtual application, resources used by the virtual application, or both. For example, the host system may receive a request from a computer, e.g., the client device or another device, that indicates a request for data identifying the resources used by the virtual application during execution. In response, the host system may generate instructions for presentation of a user interface that indicates the resources used by the virtual application, provide data to the computer that identifies the resources used by the virtual application, or both.

In some implementations, a host system may provision resources for a virtual application with a particular graphics profile on a physical graphics device that currently has physical graphics resources allocated to other virtual applications using the particular graphics profile. For instance, the host system may determine an efficient allocation of physical graphics resources by allocating resources on a particular physical graphics device to multiple virtual applications that each have the same graphics profile.

In some implementations, a host system may move or migrate a virtual application using a graphics profile for the virtual application. The host system may determine that the device, e.g., the physical graphics device or the computer that includes the physical graphics device, used to execute the virtual application failed. In response, the host system may determine to move execution of the virtual application to another device. The host system may determine whether another device is available for the graphics profile for the virtual application or whether the host system needs to determine an equivalent graphics profile that identifies graphics resources equivalent to those identified in the graphics profile for the virtual application. The host system may cause execution of the virtual application using the other device or a device for the equivalent graphics profile.

When the host system determines to migrate a virtual application, e.g., in response to a request from a client device, the host system uses a graphics profile for the virtual application to determine another device to use for execution of the virtual application. A migration request may indicate that execution of the virtual application should move from a first data center to a second data center, from a data center in a first physical geographic location to another data center in a second physical geographic location, or both. The host system may tag the virtual application, the corresponding virtual machine on which the virtual application is executing, or both, with an identifier for the graphics profile to allow the host system to use the same graphics profile when recreating the virtual machine, e.g., at the second data center or the data center in the second physical geographic location. For instance, the host system may use the tag to identify the graphics profile when the host system cannot move execution of the virtual application live and must recreate the virtual machine on a destination device.

Figure 4:
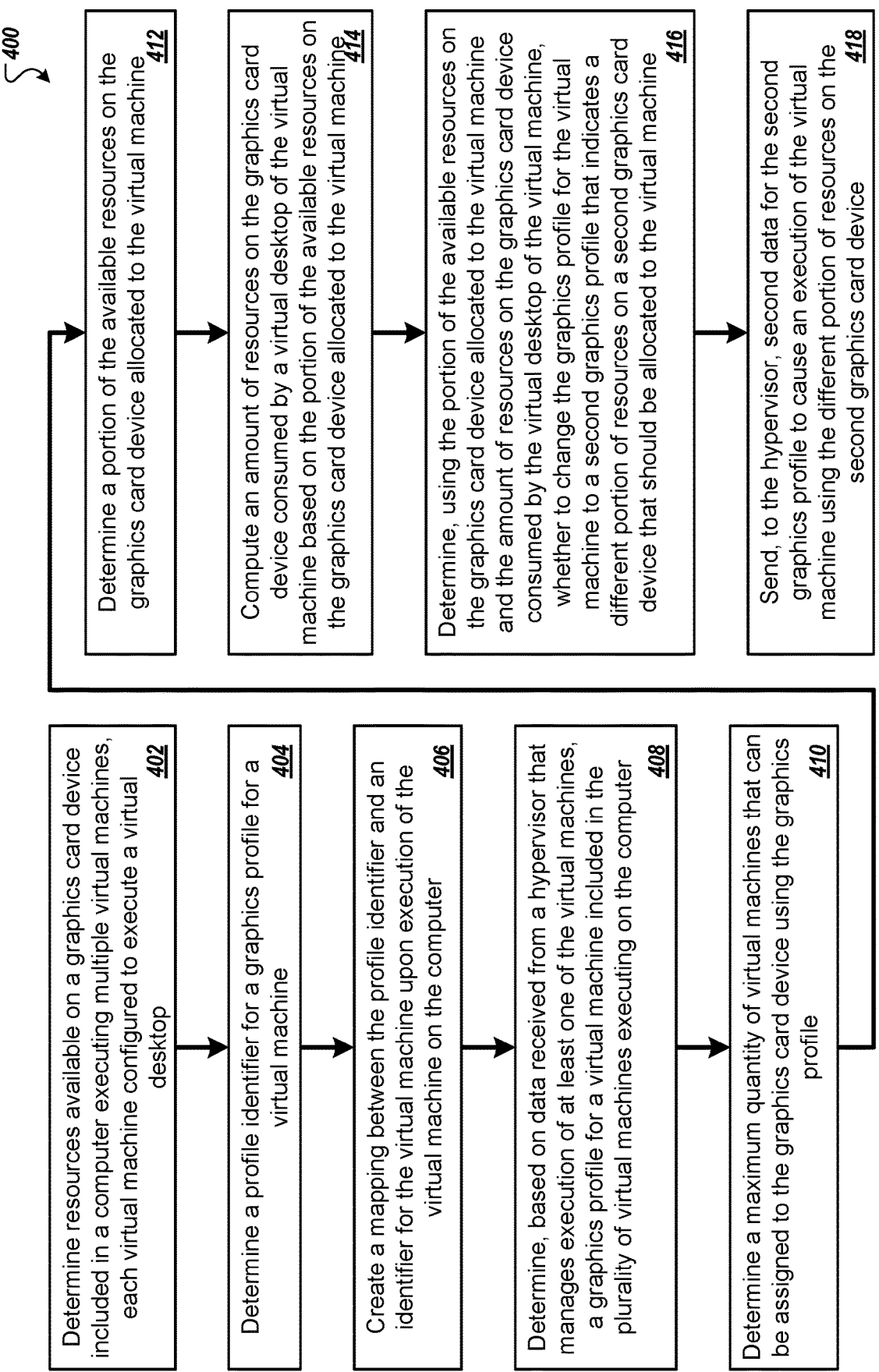
FIG. 4 is a flow diagram of a process for changing a graphics profile for a virtual machine or a virtual application executing on the virtual machine.

FIG. 4 is a flow diagram of a process 400 for changing a graphics profile for a virtual machine or a virtual application executing on the virtual machine. For example, the process 400 can be used by the host system 104 from the environment 100. One example of a virtual application includes a virtual desktop for the virtual machine. The virtual desktop may be a graphics rich virtual desktop, e.g., that requires dedicated graphics resources for execution.

At 402, a host system determines resources available on a graphics card device included in a computer executing multiple virtual machines, each virtual machine configured to execute a virtual desktop. The host system may determine a quantity of pGPUs included on the graphics card device; properties of the pGPUs, e.g., clock rate; a quantity of frame buffer memory, included on the graphics card device; properties of the frame buffer memory, e.g., speed; or a combination of two or more of these.

At 404, the host system determines a profile identifier for a graphics profile for a virtual machine. For example, the host system may receive a request to execute a particular virtual machine and determine a profile identifier that is included in the request. In some implementations, the host system does not include a mapping of a profile identifier to the virtual machine before receiving the request. For instance, the host system does not store, in memory, data that indicates a profile identifier or a graphics profile to be used for execution of the virtual machine during a session with a client device from which the host system received the request.

At 406, the host system creates a mapping between the profile identifier and an identifier for the virtual machine upon execution of the virtual machine on the computer. The host system may cause execution of the virtual machine, as one of the plurality of virtual machines, on the computer. A hypervisor, included in the host system, may cause the graphics card device to allocate the resources identified by the graphics profile for execution of the virtual machine. The hypervisor may create the mapping between the profile identifier and the identifier for the virtual machine.

The hypervisor may store the mapping in a memory. In some examples, the hypervisor may be the only component of the host system with direct access to the mapping, e.g., and other components of the host system need to request the mapping or data related to the mapping from the hypervisor. For instance, a resource analysis system, included in the host system, may request the profile identifier from the hypervisor to determine graphics resources allocated to the virtual machine during execution when the resource analysis system does not have direct access to the memory with the mapping. The resource analysis system may provide the hypervisor with the identifier for the virtual machine, or other data that identifies the virtual machine such as a device that requested execution of the virtual machine. The hypervisor uses the data received from the resource analysis system to access the mapping and determine the profile identifier. In response, the resource analysis system receives the profile identifier from the hypervisor.

At 408, the host system determines, based on data received from a hypervisor that manages execution of at least one of the virtual machines, a graphics profile for a virtual machine included in the plurality of virtual machines executing on the computer. The resource analysis system may use the profile identifier, received from the hypervisor, to access a graphics profile database. The resource analysis system may use the profile identifier as a key to select data for a graphics profile that is stored in the graphics profile database.

At 410, the host system determines a maximum quantity of virtual machines that can be assigned to the graphics card device using the graphics profile. When the graphics profile indicates a percentage of the resources for the graphics card device that are allocated to each virtual machine, e.g., and the quantity of resources allocated to each virtual machine that uses the graphics card device is the same, the resource analysis system determines the maximum quantity of virtual machines using the percentage, e.g., by dividing one by the percentage value. When the graphics profile indicates one or more quantities of respective resources, the resource analysis system uses the quantities and amounts of resources included in the graphics card device to determine the maximum quantity of virtual machines.

In some implementations, the maximum quantity of virtual machines may be associated with the graphics profile, e.g., in the graphics profile database. The resource analysis system may request the maximum quantity of virtual machines from the graphics profile database using the profile identifier.

At 412, the host system determines a portion of the available resources on the graphics card device allocated to the virtual machine. For instance, the resource analysis system may use the maximum quantity of virtual machines that can be assigned to the graphics card device and the resources available on the graphics card device to determine the portion of the available resources allocated to the virtual machine. When the graphics profile indicates a percentage of resources on the graphics card device that should be allocated to each of the virtual machines, the resource analysis system may use the total resources for the graphics card device and percentage value to determine the available resources on the graphics card device that are allocated to the virtual machine, e.g., without performing step 410.

At 414, the host system computes an amount of resources on the graphics card device consumed by a virtual desktop of the virtual machine based on the portion of the available resources on the graphics card device allocated to the virtual machine. For example, the host system determines the resources actually used by the graphics card device during execution of the virtual desktop of the virtual machine. The resources actually used may be an average, a maximum, or a series of values that represent resources used during the execution of the virtual desktop during a session. In some examples, the resource analysis system may request the amount of graphics resources on the graphics card consumed by the virtual desktop of the virtual machine from the hypervisor, e.g., that is monitoring execution of the virtual machine. The hypervisor may use an application programming interface (API) to determine the graphics resources consumed by the virtual desktop. For instance, the API may include a method that allows the hypervisor to request the consumed graphics resources for the virtual desktop. The API may include a method that allows the hypervisor to receive a list of all running virtual machines, which the hypervisor is monitoring, that are using dedicated graphics resources and a usage percentage of the graphics resources allocated to each of the virtual machines.

In some examples, a hypervisor may monitor virtual machines that are allocated physical graphics resources for a particular vendor and no other vendors. In some examples, a hypervisor may monitor virtual machines that are allocated physical graphics resources for multiple vendors. The hypervisor may include a method to determine consumed resources for all of the vendors. The hypervisor may include one method for each of the vendors that allows the hypervisor to determine consumed resources for the particular vendor.

The virtual desktop may be an operating system user interface, e.g., which includes menu options to launch applications and present information about an operating system executing on the virtual machine. The virtual desktop may be a user interface for a virtual application other than an operating system, e.g., a user interface for a graphics design application.

At 416, the host system determines, using the portion of the available resources on the graphics card device allocated to the virtual machine and the amount of resources on the graphics card device consumed by the virtual desktop of the virtual machine, whether to change the graphics profile for the virtual machine to a second graphics profile that indicates a different portion of resources on a second graphics card device that should be allocated to the virtual machine. For instance, the resource analysis system determines whether the second graphics profile indicates a more efficient allocation of resources for the virtual machine. The second graphics profile may identify more resources, fewer resources, or both, than the graphics profile. For instance, the second graphics profile may be for a different type of graphics device and indicate that more frame buffer memory should be allocated for execution of the virtual machine while a smaller vGPU is allocated for the execution of the virtual machine. The smaller vGPU may have fewer physical pGPU cores, a lower clock rate, or both.

In some implementations, the host system may determine that a particular virtual machine has not been or is not being used after execution, e.g., that minimal resources were consumed and there was not input received from a client device. The host system may provide a client device with a message that indicates that the particular virtual machine has not been or is not being used. The host system may receive a response that indicates that a session for the particular virtual machine should be terminated. In response, the host system may allocate the resources previously used for execution of the virtual machine to execution of a different virtual machine, turn off a host system that was previously executing the virtual machine, or place the host system in standby, e.g., reduce power provided to the host system.

The second graphics card device may be the same device as the first graphics card device. The second graphics card device may be the same model as the first graphics card device. The second graphics card device may be manufactured by a particular vendor that manufactured the first graphics card device. The second graphics card device may be manufactured by a different vendor than a particular vendor that manufactured the first graphics card device.

At 418, the host system sends, to the hypervisor, second data for the second graphics profile to cause an execution of the virtual machine using the different portion of resources on the second graphics card device. The host system may receive, from the client device, a second request for a second execution of the virtual machine. The second request may identify the second graphics profile. In response to receipt of the second request, the host system may send the second data to the hypervisor to cause execution of the virtual machine.

In some examples, the host system may cause a second execution of the virtual machine on a second computer that includes the second graphics card device using resources allocated to the virtual machine based on the second graphics profile. The second execution of the virtual machine is a different execution than, and occurs after, the first execution of the virtual machine.

The order of steps in the process 400 described above is illustrative only, and changing the graphics profile for the virtual machine or the virtual application executing on the virtual machine can be performed in different orders. For example, the host system may determine a graphics profile for a virtual machine and then determines resources available on a graphics card device.

In some implementations, the process 400 can include additional steps, fewer steps, or some of the steps can be divided into multiple steps. For example, the host system may perform steps 402, 408, 412, and 414 without performing any of the other steps in the process 400.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
 a data processing apparatus; and
 a non-transitory computer readable medium in data communication with the data processing apparatus and storing instructions executable by the data processing apparatus and that upon such execution cause the data processing apparatus to perform operations comprising:
  determining resources available on a plurality of graphics card devices included in a computer executing a plurality of virtual machines;
  allocating a portion of the available resources on a first graphics card device to a virtual machine of the plurality of virtual machines;
  computing an amount of resources on the first graphics card device allocated to the virtual machine that are actually consumed by a virtual desktop of the virtual machine during a first execution of the virtual machine;
  determining, based on both the portion of the available resources on the graphics card device allocated to the virtual machine and the amount of resources actually consumed during the first execution of the virtual machine, to allocate a different portion of resources to the virtual machine; and
  in response to the determination to allocate a different portion of resources, selecting a graphics profile from a collection of graphics profiles, each graphics profile indicating a specific combination of graphics resources, and allocating the different portion of the available resources on one or more of the plurality of graphics card devices to the virtual machine using the selected graphics profile.

2. The system of claim 1, wherein allocating the different portion of resources to the virtual machine includes determining to allocate a portion of resources from a second graphics card device; and
 wherein the operations comprise sending, to the hypervisor, second data to cause an execution of the virtual machine using the different portion of resources on the second graphics card device.

3. The system of claim 2, wherein sending, to the hypervisor, the second data to cause an execution of the virtual machine using the different portion of resources on the second graphics card device comprises causing the second execution of the virtual machine on a second computer that includes the second graphics card device using resources allocated to the virtual machine, the second execution of the virtual machine being a different execution than and occurring after the first execution of the virtual machine.

4. The system of claim 1, wherein the resources allocated to the virtual machine are specific to a first type of graphics card device or a first graphics card device architecture.

5. The system of claim 1, wherein the operations further comprise:
 allocating a portion of the available resources on a second graphics card device to a second virtual machine;
 computing an amount of resources on the second graphics card device actually consumed by a virtual desktop of the second virtual machine during a first execution of the second virtual machine;
 determining that the second virtual machine is not is use;
 terminating a session of the second virtual machine; and
 allocating the resources previously used for execution of the second virtual machine to execution of a different virtual machine.

6. The system of claim 1, the operations comprising:
 causing presentation of data identifying the portion of the available resources on the graphics card device allocated to the virtual machine and the amount of resources on the graphics card device consumed by the virtual desktop of the virtual machine.

7. The system of claim 1, wherein determining the portion of the available resources on the graphics card device allocated to the virtual machine comprises:
 determining a maximum quantity of virtual machines that can be assigned to the graphics card device; and
 determining the portion of the available resources on the graphics card device allocated to the virtual machine using the maximum quantity of virtual machines that can be assigned to the graphics card device.

8. The system of claim 1, wherein graphics card resources of the plurality of graphics cards are associated with a plurality of distinct virtual graphics processing units, and wherein allocating the different portion of the available resources comprises allocating a different virtual graphics processing unit to the virtual machine.

9. The system of claim 1, wherein each graphics profile indicates a specified portion of one or more graphics card devices and a specified quantity of frame buffer memory for allocation to a virtual machine executed using the graphics profile.

10. A method comprising:
 determining resources available on a plurality of graphics card devices included in a computer executing a plurality of virtual machines;
 allocating a portion of the available resources on a first graphics card device to a virtual machine of the plurality of virtual machines;
 computing an amount of resources on the first graphics card device allocated to the virtual machine that are actually consumed by a virtual desktop of the virtual machine during a first execution of the virtual machine;
 determining, based on both the portion of the available resources on the graphics card device allocated to the virtual machine and the amount of resources actually consumed during the first execution of the virtual machine, to allocate a different portion of resources to the virtual machine; and
 in response to the determination to allocate a different portion of resources, selecting a graphics profile from a collection of graphics profiles, each graphics profile indicating a specific combination of graphics resources, and allocating the different portion of the available resources on one or more of the plurality of graphics card devices to the virtual machine using the selected graphics profile.

11. The method of claim 10, wherein allocating the different portion of resources to the virtual machine includes determining to allocate a portion of resource from a second graphics card device; and
 wherein the method further comprises sending, to the hypervisor, second data to cause an execution of the virtual machine using the different portion of resources on the second graphics card device.

12. The method of claim 11, wherein sending, to the hypervisor, the second data to cause an execution of the virtual machine using the different portion of resources on the second graphics card device comprises causing the second execution of the virtual machine on a second computer that includes the second graphics card device using resources allocated to the virtual machine, the second execution of the virtual machine being a different execution than and occurring after the first execution of the virtual machine.

13. The method of claim 10, wherein the resources allocated to the virtual machine are specific to a first type of graphics card device or a first graphics card device architecture.

14. The method of claim 10, further comprising:
allocating a portion of the available resources on a second graphics card device to a second virtual machine;
computing an amount of resources on the second graphics card device actually consumed by a virtual desktop of the second virtual machine during a first execution of the second virtual machine;
determining that the second virtual machine is not is use;
terminating a session of the second virtual machine; and
allocating the resources previously used for execution of the second virtual machine to execution of a different virtual machine.

15. The method of claim 10, further comprising:
causing presentation of data identifying the portion of the available resources on the graphics card device allocated to the virtual machine and the amount of resources on the graphics card device consumed by the virtual desktop of the virtual machine.

16. The method of claim 10, wherein determining the portion of the available resources on the graphics card device allocated to the virtual machine comprises:
determining a maximum quantity of virtual machines that can be assigned to the graphics card device; and
determining the portion of the available resources on the graphics card device allocated to the virtual machine using the maximum quantity of virtual machines that can be assigned to the graphics card device.

17. The method of claim 10, wherein graphics card resources of the plurality of graphics cards are associated with a plurality of distinct virtual graphics processing units, and wherein allocating the different portion of the available resources comprises allocating a different virtual graphics processing unit to the virtual machine.

18. A non-transitory computer readable medium storing instructions executable by a data processing apparatus and upon such execution cause the data processing apparatus to perform operations comprising:
determining resources available on a plurality of graphics card devices included in a computer executing a plurality of virtual machines;
allocating a portion of the available resources on a first graphics card device to a virtual machine of the plurality of virtual machines;
computing an amount of resources on the first graphics card device allocated to the virtual machine that are actually consumed by a virtual desktop of the virtual machine during a first execution of the virtual machine;
determining, based on both the portion of the available resources on the graphics card device allocated to the virtual machine and the amount of resources actually consumed during the first execution of the virtual machine, to allocate a different portion of resources to the virtual machine; and
in response to the determination to allocate a different portion of resources, selecting a graphics profile from a collection of graphics profiles, each graphics profile indicating a specific combination of graphics resources, and allocating the different portion of the available resources on one or more of the plurality of graphics card devices to the virtual machine using the selected graphics profile.

19. The non-transitory computer readable medium of claim 18, wherein allocating the different portion of resources to the virtual machine includes determining to allocate a portion of resource from a second graphics card device; and
wherein the operations comprise sending, to the hypervisor, second data to cause an execution of the virtual machine using the different portion of resources on the second graphics card device.

20. The non-transitory computer readable medium of claim 19, wherein sending, to the hypervisor, the second data to cause an execution of the virtual machine using the different portion of resources on the second graphics card device comprises causing the second execution of the virtual machine on a second computer that includes the second graphics card device using resources allocated to the virtual machine, the second execution of the virtual machine being a different execution than and occurring after the first execution of the virtual machine.

21. The non-transitory computer readable medium of claim 18, wherein the resources allocated to the virtual machine are specific to a first type of graphics card device or a first graphics card device architecture.

22. The non-transitory computer readable medium of claim 18, further comprising instructions that when executed cause the data processing apparatus to perform operations comprising:
allocating a portion of the available resources on a second graphics card device to a second virtual machine;
computing an amount of resources on the second graphics card device actually consumed by a virtual desktop of the second virtual machine during a first execution of the second virtual machine;
determining that the second virtual machine is not is use;
terminating a session of the second virtual machine; and
allocating the resources previously used for execution of the second virtual machine to execution of a different virtual machine.

23. The non-transitory computer readable medium of claim 18, further comprising instructions that when executed cause the data processing apparatus to perform operations comprising:
causing presentation of data identifying the portion of the available resources on the graphics card device allocated to the virtual machine and the amount of resources on the graphics card device consumed by the virtual desktop of the virtual machine.

24. The non-transitory computer readable medium of claim 18, wherein determining the portion of the available resources on the graphics card device allocated to the virtual machine comprises:
determining a maximum quantity of virtual machines that can be assigned to the graphics card device; and
determining the portion of the available resources on the graphics card device allocated to the virtual machine using the maximum quantity of virtual machines that can be assigned to the graphics card device.

25. The non-transitory computer readable medium of claim 18, wherein graphics card resources of the plurality of graphics cards are associated with a plurality of distinct virtual graphics processing units, and wherein allocating the different portion of the available resources comprises allocating a different virtual graphics processing unit to the virtual machine.

\* \* \* \* \*